(12) United States Patent
Hagemann et al.

(10) Patent No.: US 10,738,988 B2
(45) Date of Patent: Aug. 11, 2020

(54) COOLING OF A CONVERTER ARRANGEMENT FOR LIGHT SOURCES WITH HIGH LUMINANCE

(71) Applicant: SCHOTT AG, Mainz (DE)

(72) Inventors: Volker Hagemann, Klein Winternheim (DE); Bernd Hoppe, Ingelheim (DE); Guenter Weidmann, Flonheim (DE); Seong-Won Kim, Gyeonggi-do (KR)

(73) Assignee: SCHOTT AG, Mainz (DE)

(*) Notice: Subject to any disclaimer, the term of this patent is extended or adjusted under 35 U.S.C. 154(b) by 444 days.

(21) Appl. No.: 14/629,629

(22) Filed: Feb. 24, 2015

(65) Prior Publication Data
US 2015/0241046 A1    Aug. 27, 2015

(30) Foreign Application Priority Data
Feb. 24, 2014   (DE) .................. 10 2014 102 350

(51) Int. Cl.
| | |
|---|---|
| *F21V 9/00* | (2018.01) |
| *F21V 29/502* | (2015.01) |
| *G03B 21/16* | (2006.01) |
| *F21K 9/64* | (2016.01) |
| *F21V 29/77* | (2015.01) |
| *F21V 14/08* | (2006.01) |
| *G03B 21/20* | (2006.01) |

(52) U.S. Cl.
CPC .............. *F21V 29/502* (2015.01); *F21K 9/64* (2016.08); *F21V 14/08* (2013.01); *F21V 29/773* (2015.01); *G03B 21/16* (2013.01); *G03B 21/204* (2013.01)

(58) Field of Classification Search
CPC ... F21K 9/56; F21V 9/16; F21V 29/77; F21V 29/773; F21V 29/025; F21V 29/40; F21V 29/502; F21V 29/673; F21V 29/67; F21V 29/60; F21S 10/007; G03B 21/204
See application file for complete search history.

(56) References Cited

U.S. PATENT DOCUMENTS

| | | | |
|---|---|---|---|
| 6,618,213 B2 | 9/2003 | Inamoto | |
| 2003/0095349 A1* | 5/2003 | Inamoto | F04D 17/08 359/889 |
| 2005/0243559 A1* | 11/2005 | Coushaine | F21K 9/00 362/294 |
| 2006/0077666 A1 | 4/2006 | Aliyama | |
| 2008/0192065 A1 | 8/2008 | Selbrede et al. | |

(Continued)

FOREIGN PATENT DOCUMENTS

| | | |
|---|---|---|
| DE | 102010034054 A1 | 2/2012 |
| DE | 102011084961 A1 | 4/2013 |

(Continued)

*Primary Examiner* — Julie A Bannan
(74) *Attorney, Agent, or Firm* — Ohlandt, Greeley, Ruggiero & Perle, L.L.P.

(57) ABSTRACT

A converter arrangement for light sources with high luminance is provided that includes an axially pivotable carrying wheel and a converter fixed on one side of the carrying wheel. The converter includes fluorescent materials that convert impinging light into light having a different wave length and emits the light having the different wavelength. The ratio of the total area of the converter arrangement to the area enclosed by the outer boundary curve of the converter is at least 3, preferably at least 3.5, particularly preferably at least 4.5.

24 Claims, 7 Drawing Sheets

(56) References Cited

U.S. PATENT DOCUMENTS

| | | | |
|---|---|---|---|
| 2009/0034284 A1 | 2/2009 | Li et al. | |
| 2009/0187234 A1* | 7/2009 | Meyer | C09K 11/06 607/88 |
| 2009/0284148 A1* | 11/2009 | Iwanaga | G02B 26/008 313/506 |
| 2010/0328617 A1* | 12/2010 | Masuda | G03B 21/14 353/31 |
| 2011/0116253 A1* | 5/2011 | Sugiyama | F21S 10/007 362/84 |
| 2013/0107222 A1 | 5/2013 | Hsu et al. | |
| 2013/0169938 A1* | 7/2013 | Huang | G03B 21/16 353/31 |
| 2013/0308332 A1 | 11/2013 | Woelfing et al. | |
| 2014/0254133 A1* | 9/2014 | Kotter | C09K 11/02 362/84 |
| 2014/0354960 A1 | 12/2014 | Miyazaki | |
| 2015/0009685 A1* | 1/2015 | Wang | G03B 21/16 362/323 |
| 2016/0077326 A1* | 3/2016 | Yamagishi | G02B 26/008 353/61 |

FOREIGN PATENT DOCUMENTS

| | | |
|---|---|---|
| DE | 102012005654 A1 | 4/2013 |
| DE | 102012204786 A1 | 9/2013 |
| DE | 102013200989 A1 | 7/2014 |
| JP | 2000338426 | 12/2000 |
| JP | 2003156796 | 5/2003 |
| JP | 2006106073 | 4/2006 |
| JP | 2008026422 | 2/2008 |
| JP | 2009539219 | 11/2009 |
| JP | 2010169828 | 8/2010 |
| JP | 2011070088 | 4/2011 |
| JP | 2012008177 | 1/2012 |
| JP | 2012018762 | 1/2012 |
| JP | 2012037681 A | 2/2012 |
| JP | 2015007751 | 1/2015 |
| WO | WO2012138020 * | 10/2012 |

* cited by examiner

COOLING OF A CONVERTER ARRANGEMENT FOR LIGHT SOURCES WITH HIGH LUMINANCE

CROSS REFERENCE TO RELATED APPLICATIONS

This application claims benefit under 35 U.S.C. § 119(a) of German Patent Application No. 10 2014 102 350.1, filed Feb. 24, 2014, the entire contents of which are incorporated herein by reference.

BACKGROUND

1. Field of the Disclosure

The invention generally relates to the cooling of converter arrangements for light sources with high luminance, in particular for high-power projectors.

2. Description of Related Art

Converter arrangements are used in conjunction with light sources, in order to change the wave length of and to re-emit the light emitted by a primary light source and impinging on the converter arrangement. This way, a light source is formed. For that purpose, the surface of the converter arrangement is for example at least partially equipped with a fluorescent material.

U.S. application No. 2009/034284 for example describes an illumination device generating light by a rotating wheel furnished with a fluorescent material and excited by radiation from a solid-state light source. The purpose of the invention described in U.S. application No. 2009/034284 is to generate various colour channels being clocked in time, by segmenting the wheel with different phosphors.

JP application No. 2012 037681 discloses the application of this principle in detail.

DE 10 2011 084 961 also describes a segmented fluorescent material wheel. Ceramic phosphor segments are used, wherein these segments may be metallised and connected with the carrying wheel by means of soldering to achieve a good thermal connection of the segments with the carrying wheel.

In these three aforementioned documents, the carrying wheel is described as a flat circular disk. According to DE 10 2011 084 961, such a flat circular disk may also have recesses or embossments for receiving the segments.

DE 10 2012 005 654 of the applicant describes a converter wheel with a venting function, for example by means of additional lamellae, to improve cooling of the converter wheel.

According to applicant's application DE 10 2010 034 054, it is particularly advantageous, if the conversion disk is self-cooling. This may for example be achieved by a winged wheel on the rotational axis of the phosphor carrier, forming a so-called radial fan. By the rotation, an airflow is generated which dissipates the heat to the environment.

Generally, excessive temperatures at the converter may generally lead to an accelerated degradation of the converter material and also of the connection to the carrier of the converter. Further, heating-up of the converter may result in a decrease of the conversion efficiency and/or a change in colour of the emitted secondary or fluorescent light.

Against this background, it is an object of the invention to provide a converter arrangement which ensures a particularly efficient cooling of the fluorescent material and thereby generates particularly high luminances, as well as to improve the long-term stability of the arrangement.

SUMMARY

Studies by the inventors have shown that particularly in case of fast rotating carrying wheels the type of connecting the converter with its support, for example gluing on or soldering on, is less limiting for efficiently cooling the converter than the heat dissipation of the carrier of the converter itself.

According to the invention, a converter arrangement for light sources with high luminance is provided. This converter arrangement comprises an axially pivotable carrying wheel, a converter fixed on one side of the carrying wheel, provided with fluorescent materials, or forming a fluorescent material, the converter converting impinging light into light having a different wave length by means of fluorescence, and emitting the light having a different wave length, wherein the ratio of the total area of the converter arrangement to the area enclosed by the outer boundary curve of the converter is at least 3, preferably at least 3.5, particularly preferably at least 4.5.

In an advantageous development of the converter arrangement according to the invention, the ratio of the total area of the converter arrangement to the area enclosed by the boundary curve of the converter is less than 50.

Various materials are possible for the carrying wheel. The advantage of the enlarged total area of the carrying wheel, however, especially comes into effect, if the used material allows for distributing the heat to be removed from the converter onto the total area of the converter arrangement. For that purpose, the thermal conductivity of this material should be greater than 50 W/mK. Metals like aluminium, but also highly heat conductive plastics may be used, for example.

Various materials come into consideration for the converter. The converter may for example comprise silicone provided with phosphor, or fluorescent material.

In a preferred embodiment, an opto-ceramics, however, is used for the converter. The advantage of using an opto-ceramics consists in high temperature stability of the converter, as well as in a clearly better heat conduction and an increased heat capacity, compared with a converter powder embedded in a matrix.

In a further development of the converter consisting of opto-ceramics, the opto-ceramics entirely consists of fluorescent material. Thereby, the fluorescent material may be designed such that it has a lower local concentration of active ions, compared with a fluorescent material in a matrix material, even though the average concentration of active ions is equal. The low local concentration of active ions is advantageous for the quantum efficiency and the thermal stability of the conversion processes.

According to a still further refinement of the invention, the opto-ceramics converter fixed on the carrying wheel has the form of a closed ring. In case of a closed ring, there are no joints between segments at which example the glue used for the connection could be exposed and may be damaged by the primary radiation having high beam density.

Particularly in case of large converter rings, however, it may be advantageous to assemble the ring from segments to reduce mechanical tensions caused by vibrations or thermally induced.

According to a still further development of the invention, the converter in the form of an opto-ceramics is fixed, preferably glued or soldered, onto the carrying wheel in segments. Soldering on, in particular by means of a metallic solder, improves the thermal connection of the opto-ceramics with the material of the carrying ring. A metallic solder may particularly additionally be effective as a reflector for improving the efficiency of the converter arrangement. Additionally, a solder connection may usually be exposed to higher temperatures than a glued connection so that the maximum temperature allowed for the converter arrangement and therefore the maximally allowed optical power of the primary light source is increased. On the other hand, a glued connection is sufficient for many applications. Compared with soldering on, processing is advantageously simple. Without limitation to a metallic solder as reflector, the carrying wheel may be light-reflecting in the area covered by the converter, or the converter may cover a light-reflecting surface of the converter arrangement, for improving the conversion efficiency. In this respect, a light-reflecting surface is preferably understood as a surface having a reflection factor of at least 75% for the fluorescent light of the converter.

Depending on the embodiment of the invention, a converter may be provided that does not continuously cover a circular track (the track described by the light beam of a primary light source during rotation of the converter arrangement) around the middle or rotational axis of the converter arrangement. This is for example the case, if an annular converter with a missing ring segment is provided. Such a missing segment may be provided in the case that the primary light shall be emitted instead of the fluorescent light at a particular time, when the converter arrangement rotates.

It generally turned out to be favourable, if the emissivity $\varepsilon$ of at least a part of the area of the carrying wheel not being covered by the converter is greater than 0.1, in particular greater than 0.7, particular preferably >0.85. In doing so, the not covered areas preferably have the above mentioned emissivities of more than 0.1, preferably more than 0.7, particularly preferably more than 0.85, on average. Though one would assume that with the temperatures prevailing at the usual converter wheel in operation, only the heat dissipation to the ambient air considerably contributes to cooling, it turned out that also the emissivity has a noticeable influence on the heat dissipation. In particular converter arrangements with opto-ceramics may be operated at high temperatures at which heat radiation comes into effect due to the Stefan-Boltzmann-Law.

For improving the heat dissipation of the converter arrangement, the area of the carrying wheel, not being covered by the converter may be blackened. In matters of heat dissipation, blackening generally results in a very high emissivity.

For being able to also use the converter arrangement according to the invention together with high-power light sources, the heat dissipation of the converter arrangement according to an embodiment the invention is greater than 15 W. Accordingly, lower heat dissipation is sufficient for light sources with a lower power. According to still a further embodiment of the invention, which in particular is suitable for silicone-based converters, the heat dissipation is at least 4 W, preferably 5 to 10 W.

Relating to the area enclosed by the outer boundary curve of the converter, it is, according to a still further development of the invention, favourable, if the heat dissipation of the converter arrangement is greater than 150 $WK^{-1}m^{-2}*F$, wherein F is the area enclosed by the outer boundary curve of the converter, specified in square meters. Preferably, the heat dissipation is greater than 180 $WK^{-1}m^{-2}*F$, and particularly preferably greater than 240 $WK^{-1}m^{-2}*F$.

In a further preferred embodiment, the converter arrangement comprises at least two wheels or disks arranged axially spaced apart from each other, one of which wheels has a converter provided with or forming a fluorescent material. The wheels are interconnected by means of suitable thermal bridges for ensuring the heat transport from the wheel provided with fluorescent material to the at least one further wheel. The total area of the converter arrangement is hereby increased, and its heat dissipation is so improved.

Furthermore, an embodiment of the converter arrangement is preferred with which the carrying wheel is formed as fan wheel. In particular, a drive motor for the carrying wheel may be provided, the motor rotating the fan wheel such that the air is axially sucked. It turned out that the cooling effect of the arrangement depends on the direction of rotation of the arrangement, provided that the fan lamellae are not radially arranged, but in an angle to the radial direction. However, this embodiment is not limited to radial fans. The arrangement of the converter on the carrying wheel formed as fan wheel and the preferred direction of rotation may vary, depending on the selected fan geometry. The features according to the invention, however, are a good heat conductivity of the fan wheel so that the converter cooling beyond the purely venting effect of the fan wheel is caused by the enlarged surface of the carrying wheel.

The carrying wheel of the converter arrangement according to the invention may also have cooling lamellae on the side facing away from the converter which lamellae cause a cooling effect by means of air circulation, due to the rotation of the carrying wheel.

In a still further embodiment of the converter arrangement according to the invention, the diameter of the carrying wheel is at least greater by a factor 1.5 than the diameter of the outer boundary curve of the converter.

Metal is particularly preferred as material for the carrying wheel, preferably also for further parts of the converter arrangement. Metal is especially suited, due to its high thermal conductivity. Additionally, solder connections for fixing the converter on the metal may well be made. Aluminium is a particularly preferred material. This metal has a high thermal conductivity and furthermore is very light. This way, unbalances at higher rotational speeds of the carrying wheel are avoided.

According to the invention, a light source having a converter arrangement is provided, wherein the converter arrangement comprises an axially pivotable carrying wheel, and a converter fixed on one side of the carrying wheel, provided with fluorescent materials, or forming a fluorescent material, the converter converting impinging light into light having a different wave length by means of fluorescence, and emitting the light having a different wave length. This light source comprises a light emitting element for illuminating a light spot on the converter, and a motor for rotating the axially mounted converter arrangement during illumination by means of the light emitting element so that the impinging radiated power of the light emitting element is distributed on a circular track on the converter after one turn of the converter arrangement. According to an embodiment of the invention, the ratio of the total area of the converter arrangement to the area enclosed by the outer boundary curve of the converter is at least 3, preferably at least 3.5, particularly preferably at least 4.5.

Alternatively or additionally, the ratio of the total area of the converter arrangement to the area enclosed by the outer edge of the circular track is at least 3.3, preferably at least 4, in particular preferably at least 5. The greater this ratio is, the better the heat introduced at the respective irradiated place may be distributed over the total area of the converter arrangement, resulting in a lower average temperature of the whole converter arrangement.

The light source may in particular comprise a laser as primary light source. Lasers may be focussed to very small beam diameters so that also the secondary light emitted by the converter is generated in an accordingly small volume. This way, a light source having a very low etendue may be created.

In a preferred embodiment, the diameter of the outer edge of the track is at least 0.8-times the diameter of the outer boundary curve of the converter, preferably at least 0.9-times the diameter of the outer boundary curve of the converter.

The light source may be a projector, in particular a high-power projector.

The reason for that is that the heat dissipation takes place over the whole irradiated area of the converter, including the border areas included in heat conduction. In case of a converter ring having a diameter of 43 mm, irradiated by a 3 mm broad beam spot in a centre distance of 20 mm, this area for example is larger by at least a factor 40 than the actual beam spot. This ratio may approximately be described by the quotient of the light spot diameter and the circumference of the path described by the light spot on the converter ring.

Despite of a low thermal conductivity, e.g. of a glue joint, the coupling of the converter to the carrier wheel is comparably good with respect to the poor thermal coupling of the rotating carrier wheel to the environmental air under these circumstances.

This is illustrated by the estimations of the respective thermal resistances, compiled in the following Table 1.

TABLE 1

Estimations of the thermal resistances

| | THERMAL CONDUCTIVITY [W/mK] | THICKNESS [mm] | HTC [W/m$^2$K] | OD [mm] | ID [mm] | AREA [mm$^2$] | THERMAL RESISTANCE [K/W] |
|---|---|---|---|---|---|---|---|
| Ceramic converter | 6 | 0.2 | 30000 | 30 | 20 | 392.70 | 0.085 |
| Bond (silicone adhesive) | 0.3 | 0.01 | 30000 | 30 | 20 | 392.70 | 0.085 |
| Rotating wheel | | | 150 | 30 | 0 | 706.86 | 9.431 |

BRIEF DESCRIPTION OF THE DRAWINGS

In the following, the invention is described in more detail, with reference to the enclosed drawings, wherein same reference signs refer to same parts. In the figures.

DETAILED DESCRIPTION

As already stated, studies by the inventor revealed that cooling the carrying wheel is the decisive factor for efficiently cooling a converter arrangement.

If one does this estimation for different wheel geometries, it becomes apparent that greater wheel diameters have a significantly lower thermal resistance to the ambient air, but also that still more than 95% of the thermal resistance is attributed to the cooling of the wheel.

Figure 1:
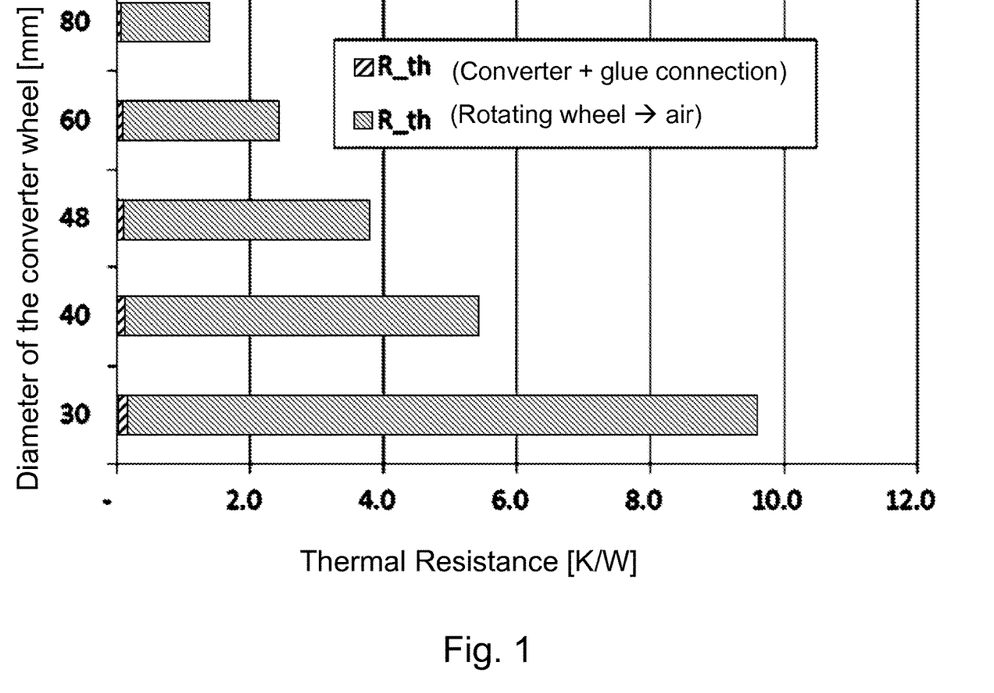
FIG. 1 is a diagram concerning the dependency of the diameter of the carrying wheel on its thermal resistance.

These correlations are illustrated in the diagram of FIG. 1 which shows the dependency of the diameter of the carrying wheel and its thermal resistance. For each selected diameter value, a bar is shown which represents the glue's portion of the thermal resistance, as well as the thermal resistance's portion of the passage from the rotating wheel to the air.

These estimations are based on the fact that the rotation of the carrying wheel effectively ensures good averaging. This means that the local heating of the converter at the currently irradiated spot has to be low, compared with the averaged heating. This is fulfilled, if the thermal conductivity of the converter itself is high and if the heat capacity is high, because the current irradiation then does not effect an immediate, high temperature increase. These two requirements are met in case of typical rotational speeds of 7200 rotations per minute of opto-ceramics converters. If there is too high a local heating of the converter in the beam spot, the rotational speed of the converter arrangement may be increased for reducing the temperature in the beam spot and to approximate the averaged temperature of the converter.

For providing a converter arrangement with high cooling effect, the following features or combinations of features therefore are advantageous.

Using a ceramic converter material.

A rotational speed of the carrying wheel, being high enough for achieving a sufficient averaging of the temperature over the converter arrangement.

A carrying wheel having a significantly enlarged surface compared to the converter circle. A carrying wheel made of a material with a good thermal conductivity for being able to efficiently distribute and release the heat over the significantly enlarged surface.

A carrying wheel with cooling lamellae, or another advantageous fan-like geometry effecting a well air circulation.

A carrying wheel having an increased emissivity for heat radiation.

A converter arrangement allowing high operating temperatures for being able to benefit from the increased emissivity.

In the following, numerical studies for using YAG opto-ceramics (opto-ceramics=OC) for high-power projectors are described.

Reflective disks were considered as carrying wheels on which the opto-ceramics was deposited in the form of a circular ring. These disks are mirror finished, at least below the opto-ceramics.

The following Table 2 shows the material and geometry parameters of the considered disks.

TABLE 2

Material and geometry parameters of the considered disks

| PARAMETER | VALUE | UNIT |
| --- | --- | --- |
| Disk diameter | 50 ... 80 | mm |
| Disk thickness | 0.5 ... 1.0 | mm |
| Width OC-ring | 4 | mm |
| Thickness OC-ring | 200 | μm |
| Thickness silicone adhesive | 10 | μm |
| Rotational frequency | 7200 | min$^{-1}$ |
| Laser power | Max. 200 | W |
| Thereof thermal losses in the OC | 25 | % |
| Box: | | |
| Beam profile | 2$_{tan}$ × 3$_{rad}$ | mm$^2$ |
| Absorption coefficient | 10000 | 1/m |
| Thermal conductivity OC | 10 | W/Km |
| Thermal conductivity adhesive | 0.3 | W/Km |
| Density OC | 4560 | Kg/m$^3$ |
| Specific heat capacity OC | 590 | J/kgK |

If one assumes that it works to convectively cool the disk on both sides with a heat transmission coefficient of h=50 Wm$^{-2}$K$^{-1}$, the disk would be on average heated up by $$\Delta T = \frac{P}{ah} = \frac{50W}{2\pi 0{,}025^2 m^2 50 W/m^2 K} \approx 255 K,$$

compared with the environment.

For a stationary calculation of the rotating disk, it is estimated, how great the real temperature increase $\dot{T}$ of a point in the opto-ceramics will be, depending on the irradiated power P. The following applies:

P=mc$_p$$\dot{T}$

Relating to the volume (p: power density in W/m$^3$), the following analogically applies:

p=ρc$_p$$\dot{T}$

Assuming that 50 W are deposited in a volume of 2×3×0.1 mm$^3$, one gets:

p=50 W/0.6·10$^{-9}$ m$^3$≈83·10$^9$ W/m$^3$ and $\dot{T}$≈31·10$^3$ K/s

With a cycle duration of τ=1/f =1/120 Hz≈8.3 ms, an average path length of L=πD=π46 mm≈145 mm, and a spot width of b=2 mm, a heating-up time of t$_{Puls}$=τb/L≈0.12 ms results, at every spot of the irradiated opto-ceramics.

During this time, the temperature increases by

Δ$\dot{T}$=t$_{Puis}$$\dot{T}$≈3.7K

Compared with the expected temperature level, this is low so that the assumption of stationary heat sources in a 3 mm wide ring volume may be done.

Exemplary Embodiment 1

Figure 2:
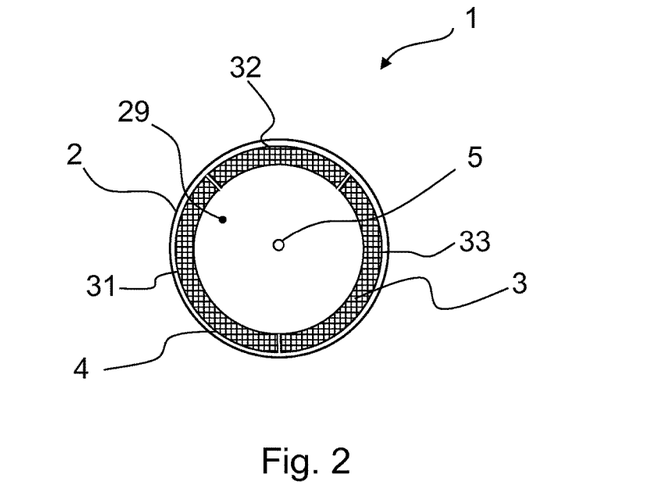
FIG. 2 shows a converter arrangement with axially symmetric carrying wheel and circular ring shaped converter, according to prior art.

In terms of the ratio of the total area of the converter arrangement to the area enclosed by the boundary curve of the converter, FIG. 2 shows a usual converter arrangement 1 having a flat, circular carrying wheel 2 on which a converter 3 is mounted. All further features of the converter arrangement shown in FIG. 2 may in comparison also be features of a converter arrangement according to the invention.

The carrying wheel 2 is axially symmetrically mounted so that it may be rotated about an axis running through its centre 5.

In FIG. 2, the converter 3 is formed as a circular ring which is hardly spaced apart from the lateral edge, or from the perimeter of the carrying wheel 2, respectively. The converter 3 mounted on the carrying wheel 2 is delimited by an outer, in this case circular boundary curve 4. The area enclosed by the outer boundary curve 4 is, other than provided according to the invention, approximately as large as the area enclosed by the perimeter of the carrying wheel. Typical dimensions are shown by table 3. If additionally the area of the rear side of the carrying wheel 2 is added which is also effective for cooling, the ratio of the total area of the converter arrangement 1 to the area enclosed by the boundary curve 4 of the converter 3 is at best slightly greater than 2.

Figure 3:
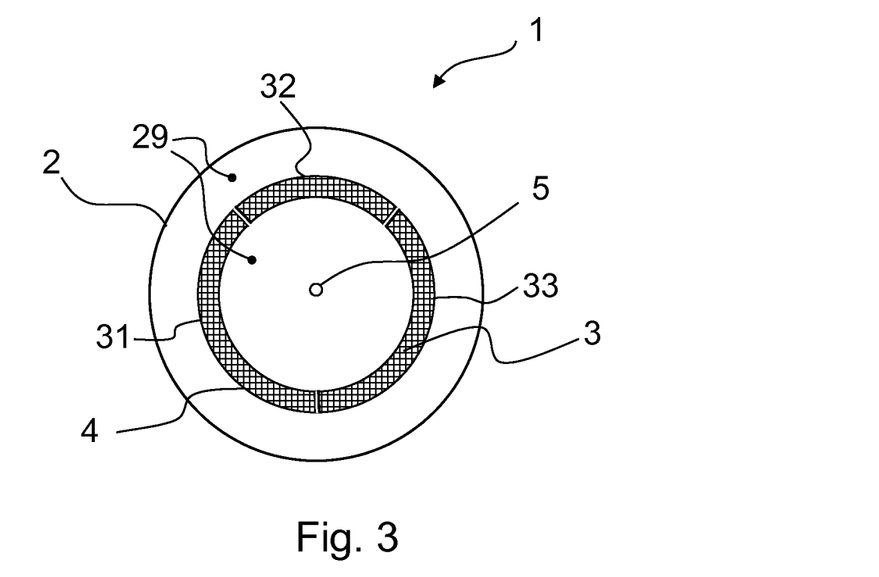
FIG. 3 shows a converter arrangement with axially symmetric carrying wheel and circular ring shaped converter, wherein the diameter of the carrying wheel is considerably greater than the diameter of the converter.

In FIG. 3, the converter 3 is formed as a circular ring which is considerably spaced apart from the lateral edge, or from the perimeter of the carrying wheel 2, respectively. The converter 3 mounted on the carrying wheel 2 is delimited by an outer, in this case circular boundary curve 4. Due to the distance to the edge of the carrying wheel 2, the outer boundary curve 4 has a considerably smaller diameter than the perimeter of the carrying wheel 2. Accordingly, the area enclosed by the outer boundary curve 4 is smaller than the area enclosed by the perimeter of the carrying wheel 2. If one additionally adds the area of the rear side of the carrying wheel 2 which is also effective for cooling, the ratio of the total area of the converter arrangement 1 to the area enclosed by the boundary curve 4 of the converter 3 is at least 3, preferably at least 3.5, particularly preferably at least 4.5. With converter arrangements being usual up to now, the distance between the converter and the edge of the carrier is only a few millimetres. Even with small carrying wheels, a ratio of the total area of the converter arrangement to the area enclosed by the boundary curve 5 of the converter 3 then only amounts to less than 2.5. Typical values are shown in table 3.

TABLE 3

Ratio of the total area of the converter arrangement to the area enclosed by the boundary curve of the converter for different converter arrangements.

| REMARK | | TYPICAL PRIOR ART | | | ARRANGEMENTS ACCORDING TO THE INVENTION | |
|---|---|---|---|---|---|---|
| Diameter converter ring | [mm] | 30 | 48 | 60 | 44 | 44 |
| Diameter converter arrangement | [mm] | 33 | 50 | 65 | 50 | 80 |
| Enclosed area converter ring | [mm$^2$] | 707 | 1810 | 2827 | 1521 | 1521 |
| Surface converter Arrangement (front side and rear side) | [mm$^2$] | 1711 | 3927 | 6637 | 3927 | 10053 |
| Area ratio | | 2.4 | 2.2 | 2.3 | 2.6 | 6.6 |

According to an embodiment of the invention, the converter 3 may also be assembled from segments, or several converters 3 may be used in the form of segments arranged side by side. With the examples shown in FIG. 2 and FIG. 3, the circular ring of the converter 3 is assembled from three segments 31, 32, 33. The segments, preferably each made of opto-ceramics, are glued on the carrying wheel 2, or soldered on. The segments 31, 32, 33 may in particular also have different converter materials so that, when the carrying wheel rotates, the different converter materials are successively illuminated by a light emitting element, and then each emits secondary light of different colours. This for example makes sense with projectors for generating colour pictures, by means of a DMD component (DMD="Digital Mirror Device) illuminated by the secondary light and switched in time with the change between the segments.

The converter 3 of the embodiment of FIG. 2 is shown as closed circular ring. But it also is possible, to for example use an open circular ring as converter 3, and to complement a segment by a light-scattering medium. Thereby, also the colour of the primary light may be used for the application as projector as further colour, additionally to the varicoloured emitting converter segments. In the case of converter 3 being in the shape of an open circle or an open circular ring, a full circle with the outer diameter of the converter is understood as outer boundary curve.

Opto-ceramics entirely consisting of a fluorescent material is provided as material for the converter 3. Alternatively, the converter 3 may also comprise silicone provided with phosphor. In this case, the converter 3 is also provided with fluorescent material. It is the object of the respective fluorescent material to convert impinging light into light having a different wavelength and to re-emit the light having a different wave length. Preferably, a monolithic, single phase opto-ceramics is used for the converter.

When optoceramics is used, this may be soldered on the carrying wheel 2. The solder connection creates a good heat contact of the converter to the carrying wheel.

According to a still further embodiment of the invention, arranging the converter 3 on the carrying wheel 2, however, may also be effected by gluing.

In both cases, it is favourable if the surface covered by the converter is light-reflecting. In case of a solder connection, this feature may easily be achieved by selecting a suited, light-reflecting, metallic solder, in particular with a coefficient of reflection of at least 75% for the fluorescent light emitted by the converter, when a suited primary light is irradiated. If the converter 3 is glued on, the glue may be transparent, and the area the converter 3 is glued on may be correspondingly, formed light-reflecting, preferably with the mentioned coefficient of reflection of at least 75 %.

According to a development of the invention, the emissivity ε of at least a part of area 29 of the carrying wheel 2, not covered by the converter is greater than 0.1, in particular greater than 0.7, particularly preferably >0.85. The higher the emissivity is, the better the area of the carrying wheel 2, not covered by the converter may reemit the absorbed heat as heat radiation. Even with the intended temperatures of the converter arrangement, being as low as possible, a significant improvement of the cooling efficiency may be achieved by increasing the emissivity of the not covered area 29. In particular aluminium, as a material being preferred for the carrying wheel due to its high thermal conductivity and heat capacity, has a very low emissivity. In this regard, increasing the emissivity, in particular by blackening the area not being covered by the converter 3, may cause an improvement of cooling by increasing the heat emission.

In consideration of cooling the converter arrangement 1, the ratio of the total area of the converter arrangement 1 to the area enclosed by the boundary curve of the converter 3 is selected such that it is at least 3, preferably at least 3.5, particularly preferably at least 4.5.

The area ratio, however, does preferably not exceed a value of 50. This is favourable, because on the one hand material and weight are saved, and, on the other hand, the increase of cooling effect decreases with increasing area ratio.

The area of the carrying wheel 2, not covered by the converter 3 may be blackened.

By means of the measures according to the invention, in particular by means of the high area ratio of the converter surface to the enclosed area of the outer boundary curve of the converter, the converter arrangement may now be designed such that the heat dissipation of the converter arrangement is greater than 150 WK$^{-1}$m$^{-2}$*F, preferably greater than 180 WK$^{-1}$m$^{-2}$*F, and particularly preferably greater than 240 WK$^{-1}$m$^{-2}$*F, wherein F is the area enclosed by the outer, boundary curve of the converter, stated in square meters.

In a development of this embodiment of the converter arrangement 1 according to the invention, the diameter of the carrying wheel 2 is at least greater by a factor 1.5 than the diameter of the boundary curve 4 of the converter 3.

Calculating this axially symmetrical model resulted in the following results. An exemplary calculation was done for a rotational speed of n=7200 min$^{-1}$. A value of $P_{therm}$=23 W was assumed as heat power homogenously distributed in the opto-ceramics. The air could freely stream in and out with 30° C., on both sides of the disk. Furthermore, it was assumed that there is no other forced convection. A cylindrical lateral side of the disk was assumed to which the air adiabatically adheres. The dimensions of the disk, of the opto-ceramics and of the glue were selected like in table 1. A chamber diameter of 80 mm was assumed.

The calculations were done by means of a turbulence model SST-kω w with low-re correction. The air was assumed to be an incompressible, ideal gas. The values for $c_p$, µ and h were assumed, according to kinetic theory of gases.

On the disk surface, a calculated averaged heat transition coefficient of h≈24 Wm$^{-2}$K$^{-1}$ resulted for a reference temperature of 30° C. for the ambient air. The thermal transition coefficient h is largely independent on the disk radius. A heat power of 23 W was fed into the opto-ceramics. About 4 W thereof were transferred to the ambient air, and about 19 W to the disk.

In this context, it has to be noticed that turbulence models always are only approximations describing reality more or less well, depending on the application. Absolute statements therefore are difficult without calibrations. Relative statements for evaluating measures for an improved cooling, however, may be done.

Exemplary Embodiment 2

Figure 4:
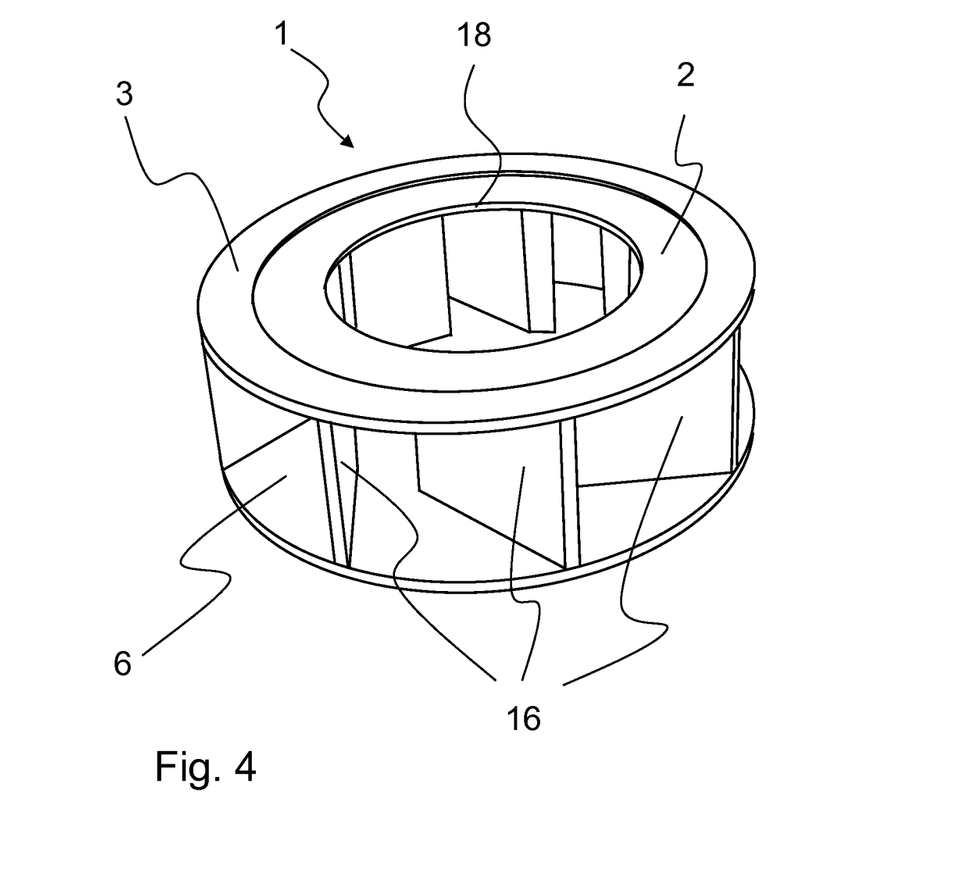
FIG. 4 shows a converter arrangement with cooling lamellae mounted on the carrying wheel.

FIG. 4 shows another converter arrangement 1 according to the invention with a converter 3 mounted on a carrying wheel 2, however, in this case the carrying wheel 2 has cooling lamellae 16 on the side facing away from the converter 3. These cooling lamellae are perpendicular to the surface of the carrying wheel 2, and are in thermal contact with the carrying wheel 2. Overall, the total surface of the carrying wheel 2 is increased due to the cooling lamellae 16. The heat dissipation of the converter arrangement is hereby increased. If the carrying wheel 2 is additionally rotated about its central axis, an air draught is generated further increasing the heat dissipation. The cooling lamellae may also be mounted on an additional plate 6. Concerning the geometry of the converter 3 and the material used for the converter 3, basically the same considerations apply, as for embodiment 1.

Calculating this embodiment resulted in the following results, compared with a disk according to Embodiment 1.

A 45°-segment of a fan wheel was developed as a model for a coupled current and temperature calculation.

A thickness of 200 µm and a value of 4 mm for the width of the circular ring were used as geometry parameters for the opto-ceramics.

The carrying wheel for the opto-ceramics was assumed to be an aluminium mirror carrier having a thickness of 0.5 mm, an inner hole diameter of 25 mm, and an outer diameter of 44 mm.

The following factors were also taken into account: adhesive between opto-ceramics and mirror: thickness d=10 µm, λ=0.3 WK$^{-1}$m$^{-1}$, adhesive between mirror and fan wheel: d=45 µm, λ=1.7 WK$^{-1}$m$^{-1}$, the material of the fan wheel is aluminium, λ=202 WK$^{-1}$m$^{-1}$, and revolutions per minute: 7200 rpm (both directions of rotation were considered for the fan wheel).

The fan wheel was installed in a cylindrical housing whose radius is greater by 20 mm than the radius of the wheel, and which is extended by 25 mm, on both sides, in axial direction.

Free inlet and escape of the air via the front surfaces of the housing.

The lateral side was assumed as being adiabatic with an adhering condition for the current.

Radiation was not considered.

The calculation was done stationarily. It was assumed that homogenous source terms are present in the opto-ceramics so that the entire thermal power there deposited is 20 W. This assumption is justified with sufficiently quickly rotating converter arrangements, as has already been shown.

Various models (S11, s12, . . . , s25) for the fan wheel were considered whose material and geometry parameters may be taken out of the following table. In this table, "CW" means clockwise, and "CCW" means counter-clockwise.

TABLE 3

| | material and geometry parameters fan wheel | | | | | | |
|---|---|---|---|---|---|---|---|
| Model | Direction Of rotation | DM [mm] | $T_{max}$ [° C.] | $A_{free\,sf}$ [mm$^2$] | $P_{OC}$ [W/m$^2$K] | $h_{ave}$ [W/m$^2$K] | $R_{therm}$ [K/W] |
| S11 | CW | 44 | 254 | 7720 | 1.99e8 | 12 | 11.2 |
| S12 | CCW | 44 | 134 | 7720 | 1.99e8 | 28 | 5.2 |
| S21 | equal | 44 | 309 | 3160 | 1.99e8 | 23 | 13.95 |
| S22 | equal | 50 | 247 | 4064 | 1.73e8 | 23 | 10.85 |
| S23 | equal | 60 | 178 | 5816 | 1.42e8 | 24 | 7.4 |
| S24 | equal | 75 | 118 | 9040 | 1.12e8 | 27 | 4.4 |
| S25 | equal | 100 | 74 | 15984 | 0.83e8 | 33 | 2.2 |

The following abbreviations are used in the preceding table:
DM: Outer diameter of the disk,
$T_{max}$: Maximum temperature occurring in the opto-ceramics,
$A_{free\,sf}$: Entire surface being in contact with air,
$P_{OC}$: Given power density homogenous in the opto-ceramics so that 20 W are integrally released,
$h_{ave}$: Heat transition with respect to 30° C. coefficient averaged over all free surfaces: $P=h_{ave}A(T_{ave}-T_{env})$ By doing so, the temperature to be expected in case of powers not equal 20 W may be calculated.
$R_{therm}$: Thermal resistance of the opto-ceramics with respect to the environment.

In the case of the fan wheel, also the direction of rotation has an influence. The fan wheel is rotated by means of a motor such that air is drawn in axially and blown off, radially along the converter carrier. In doing so, the volumetric flow rate depends on the average angle-of-attack and the design of the fan lamellae which simultaneously act as cooling lamellae. With the embodiment shown in FIG. 4, the volumetric flow rate and the cooling effect are at their peaks, due to the angle-of-attack of the cooling-lamellae 16, in case of a counter-clockwise rotation.

Figure 5:
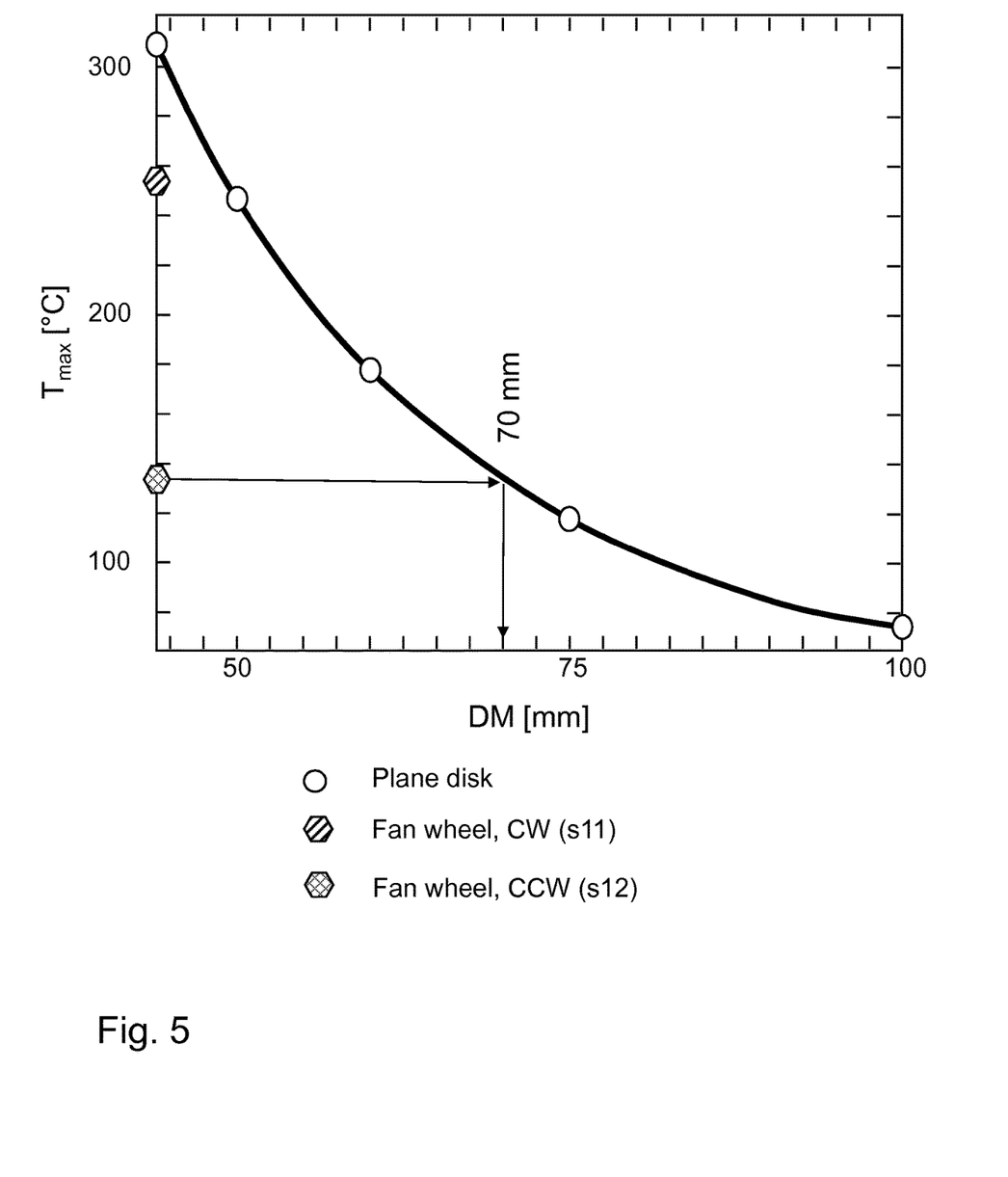
FIG. 5 is a diagram concerning the dependency of the maximum temperature on the disk diameter.

FIG. 5 shows the dependency of the accruing maximum temperature $T_{max}$ on the disk diameter DM, for a face plate, and for the models s11 and s12 of a fan wheel. The abbreviations CW and CCW, as in FIG. 4, stand for "clockwise" and "counter-clockwise". The diagram of FIG. 5 for example shows that a disk having a diameter of about 70 mm has the same cooling effect like the model s12 for the fan wheel. The maximum temperature therefore is significantly lower in case of the counter-clockwise rotation than in case of the clockwise rotation. Like with the example shown in FIG. 4, the air inlet takes place in axial direction through the opening 18, with the air outlet through the cooling and fan lamellae, in case of the tested fan wheel. With clockwise rotation, the angle-of-attack of the lamellae and the direction of rotation are not matched with each other, and the cooling effect is considerably lower.

In the model, the heat dissipating effect of the drive shaft of the fan wheel was not taken into consideration.

Figure 6:
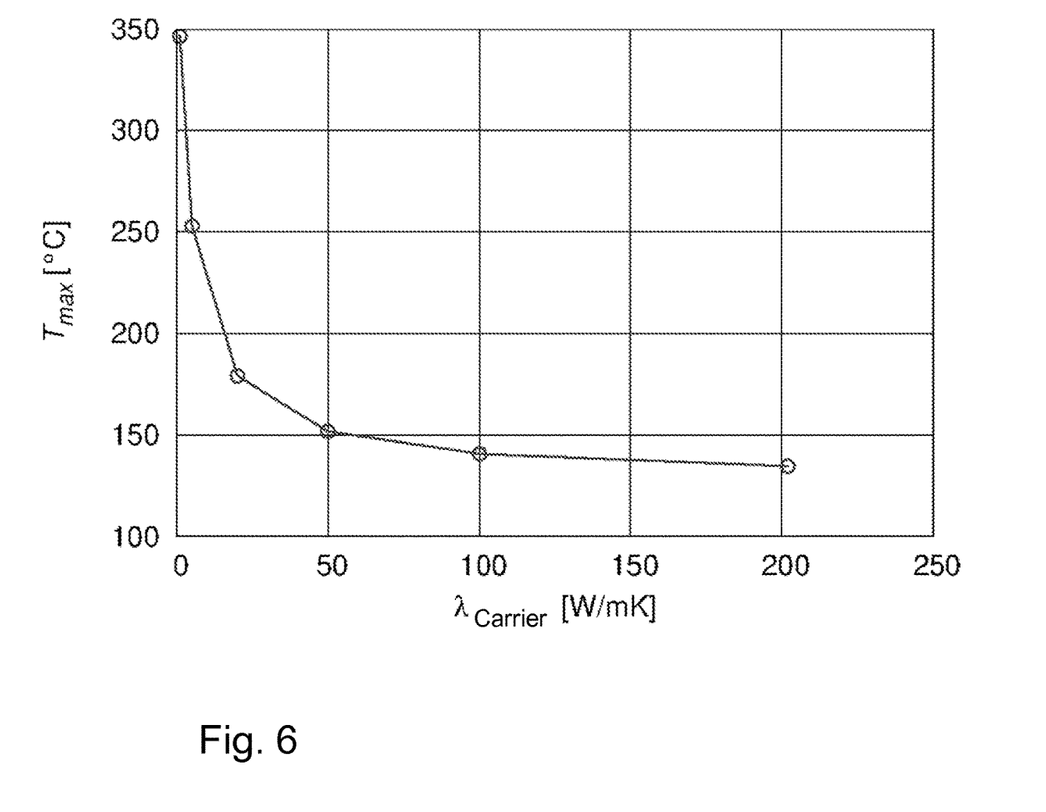
FIG. 6 is a diagram concerning the dependency of the maximum temperature of the converter on the thermal conductivity of a carrying wheel with cooling lamellae.

Since both the air flow effected by the fan wheel and the heat dissipation over the enlarged surface of the fan wheel are relevant for cooling, the material of the fan wheel should allow a sufficient heat transmission. FIG. 6 shows that the maximum temperature of the converter dramatically increases, if the thermal conductivity of the fan wheel material is below $\lambda=50$ $WK^{-1}m^{-1}$. The exact curve progression depends on the exact geometry of the fan wheel.

Exemplary Embodiment 3

Figure 7:
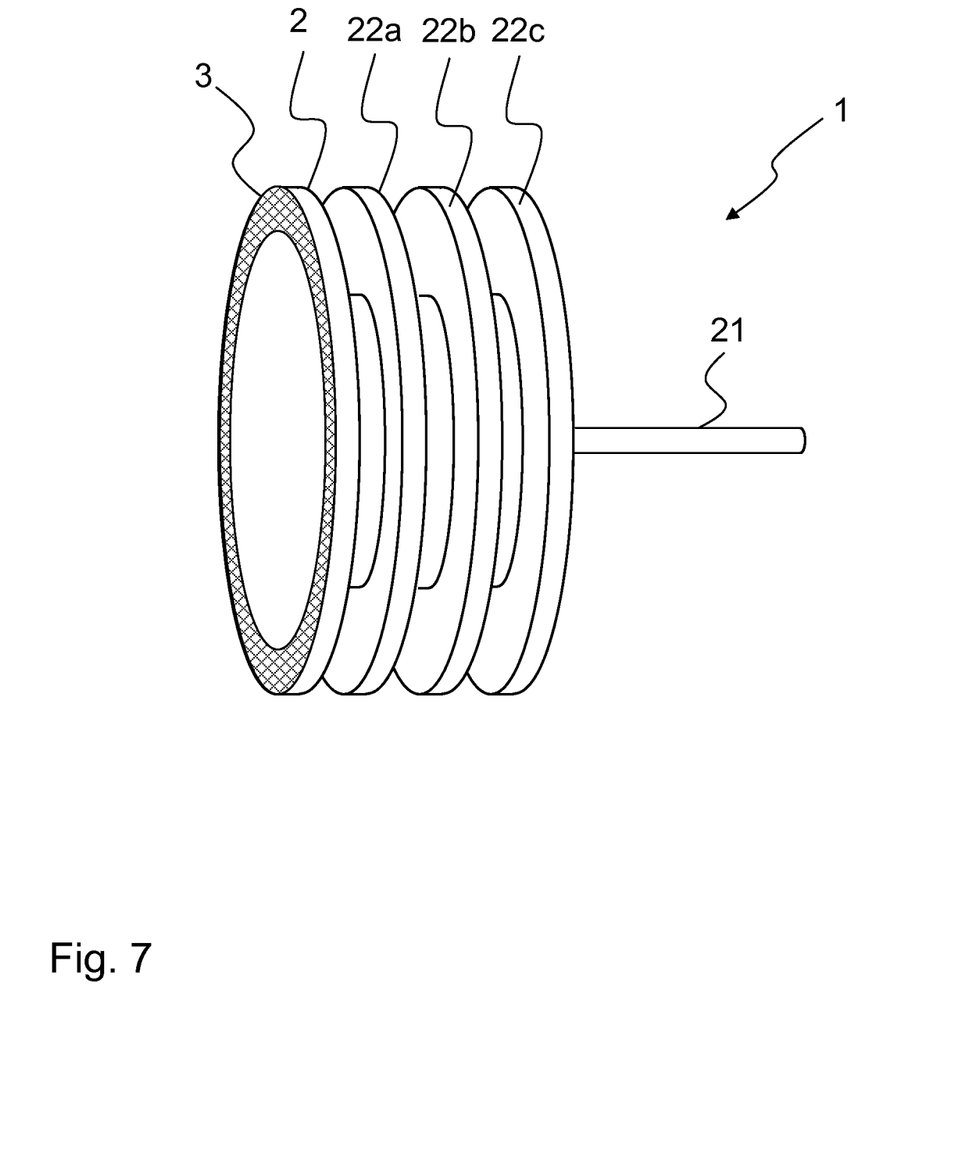
FIG. 7 shows a converter arrangement with a carrying wheel having several disks axially arranged one after another.

Now referring to FIG. 7, an embodiment is described with which a converter arrangement 1 comprises several wheels, or disks 2, 22a, 22b, 22c, respectively, which are arranged on a common axis, and are axially spaced apart. Only one of these disks, here 2, carries a converter 3 and therefore serves as carrying wheel. In FIG. 7, a converter arrangement 1 is shown which has three further disks, additionally to the carrying wheel 2. According to the invention, a converter arrangement with only two disks, however, of which one, as a carrying wheel, carries the converter, and a converter arrangement with three additional disks are possible.

It also is within the scope of the invention to provide a light source which has a converter arrangement according to the invention. The light source further comprises a light emitting element for illuminating a light spot on the converter 3. If the axially mounted converter arrangement 1 is rotated during the illumination, by means of a motor, the impinging radiation power of the light emitting element is distributed on a circular track on the converter 3, after one rotation of the converter arrangement 1.

The diameter of outer edge of the track of the light source is at least 0.8-times the diameter of the boundary curve of the converter 3, preferably at least 0.9-times the diameter of the boundary curve of the converter 3.

In a preferred development, the light source comprises a laser what enables higher illuminating power.

Preferably, the light source is the light source of a projector, in particular of a high-power projector.

Figure 9:
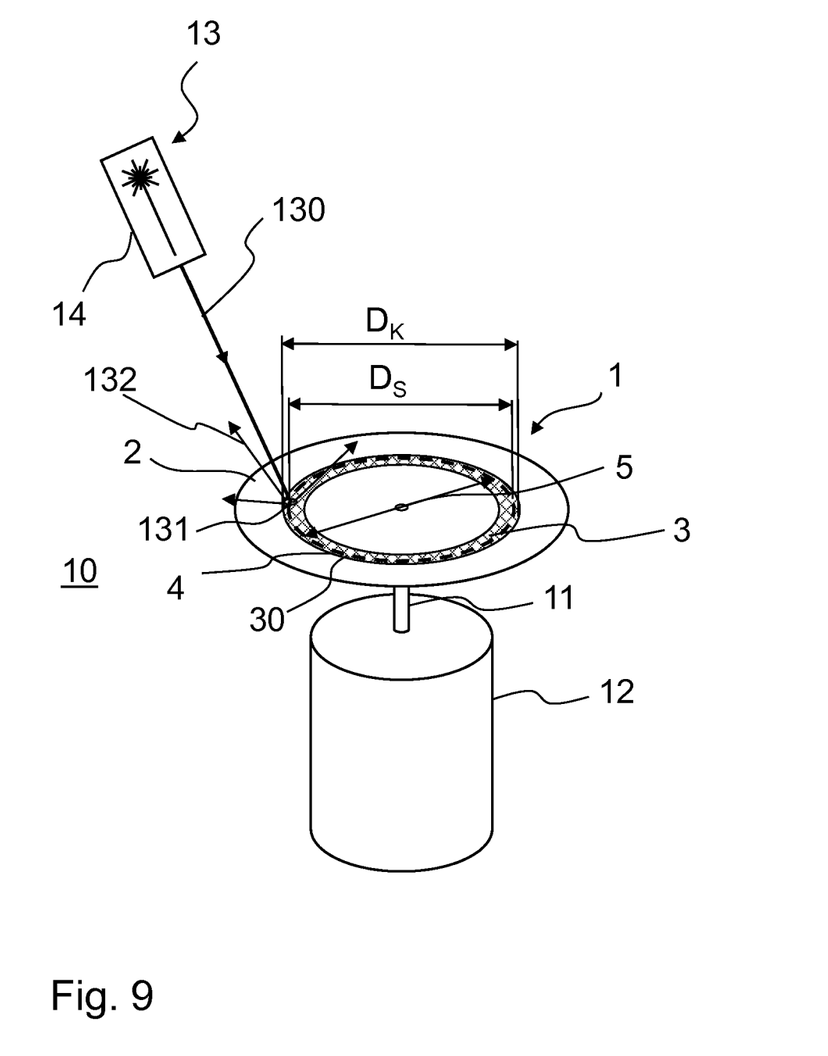
FIG. 9 shows a light source with a converter arrangement.

An example of such a light source 10 is shown in FIG. 9, in a perspective view. The light source 10 comprises a light emitting element 13, preferably in the form of a laser 14. The light emitting element 13 radiates a primary light beam 130 onto the converter 3 of the converter arrangement 1. The point of impact of the primary light beam 130 forms a light spot 131. At the light spot 131, the impinging primary light is converted into secondary light 132 having a different, generally longer wave length, and re-emitted. As symbolized by the arrows directing into various directions, emission of the secondary light is diffuse. The converter arrangement 1 is axially mounted to a motor 13 by means of a shaft 11, and rotated, by the motor 12, during illumination by the light emitting element 13. The impinging radiation power of the light emitting element is thus distributed on a circular track 30 on the converter 3, after one turn of the converter arrangement 1. The outer edge of the circular track 30 has a diameter $D_S$.

It is favourable to select the diameter $D_S$ slightly lower than the diameter $D_K$ of the outer boundary curve 4 of the converter. By doing so, it is ensured that the track of the light spot 131 does not intersect the outer boundary curve 4 of the converter 3. But also concerning the circular track, like accordingly for the outer boundary curve, it applies that the ratio of the total area of the converter arrangement 1 to the area enclosed by the outer edge of the circular track 30 is at least 3.3, preferably at least 4, particularly preferably at least 5, for achieving a good cooling of the converter arrangement 1.

On the other hand, the track 30 also should be as long as possible for achieving a good distribution of the radiation power on the converter 3. In developing the invention further, it is therefore additionally provided that the diameter $D_S$ of the outer edge of the track 30 is at least 0.8-times the diameter $D_K$ of the outer boundary curve 4 of the converter 3. preferably at least 0.9-times the diameter $D_K$ of the outer boundary curve 4 of the converter 3.

Exemplary Embodiment 4

Figure 8:
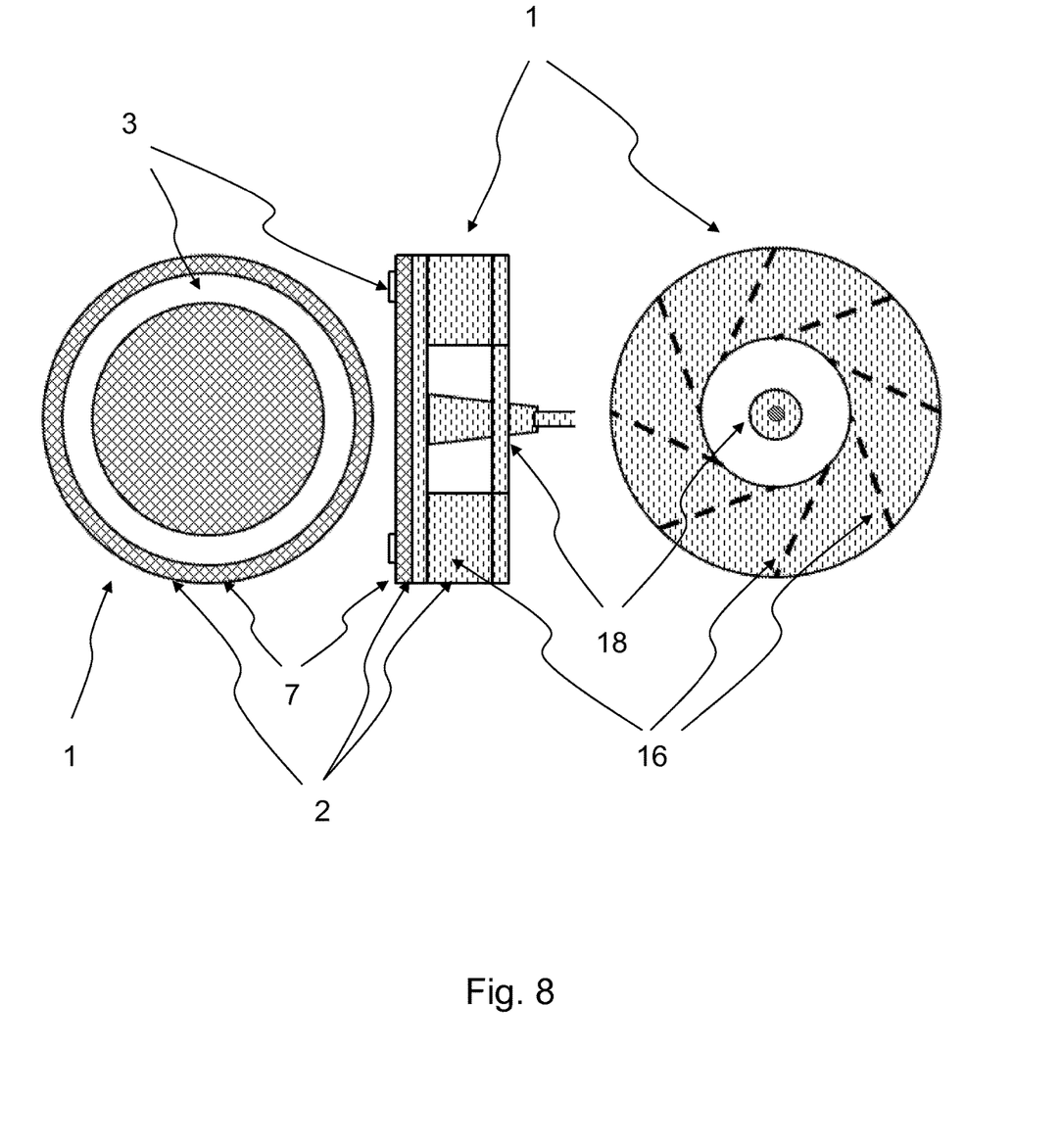
FIG. 8 shows a converter arrangement with a fan wheel, blackened mirror substrate, and air supply from the side facing away from the converter.

Referring to FIG. 8, a converter arrangement 1 is described which also is based on a fan wheel. The carrying wheel 2 here comprises two parts, a partially blackened mirror substrate or mirror carrier 7, respectively, and a second part of the carrying wheel with fan and cooling lamellae 16. Both parts are in good thermal contact. The partially blackened mirror substrate 7 for example is a metallic mirror substrate which is roughed and blackened outside the converter, for increasing the heat transfer to the air and the emissivity. The cooling air is fed through an opening 18, on the side facing away from the converter. Due to lack of space, this may be advantageous in a complete system in which an optical system for light guiding is arranged in front of the converter. Further, with this air guide with radial air output, a dust deposit on the converter is counteracted. Without limitation to the special example shown in FIG. 8, it is therefore provided in a further advantageous development of the invention that the carrying wheel 2 is formed as fan wheel such that air is inlet from the side of the converter arrangement facing away from the converter 3 during rotation of the carrying wheel, by means of a motor. As said, this may take place through an opening 18 on the side of the converter arrangement 1 facing away from the converter 3.

It is apparent to the person skilled in the art that the invention is not limited to the shown embodiments, but may rather be varied in a variety of ways, within the scope of the subsequent claims. In doing so, in particular the features of the individual embodiments may be combined with each other. The light source 10 shown in FIG. 9 may so be realized with each of the embodiments illustrated in FIGS. 2, 3, 5, and 8. Each of the described embodiments may also have a segmented converter according to the embodiment of the invention shown in FIG. 2.

LIST OF REFERENCE SIGNS:

1 Converter arrangement
2 Carrying wheel

3 Converter
4 boundary curve of converter 3
5 Central point of carrying wheel 2
6 Plate
7 Partially blackened mirror substrate
10 Light source
11 Drive shaft
12 Motor
13 Light emitting element
14 Laser
16 Cooling lamella
18 Opening
21 Axis
22a Disk
22b Disk
22c Disk
29 Area not covered by converter 3
30 Track
31, 32, 33 Segments of 3
130 Primary light beam
131 Light spot
132 Secondary light

What is claimed is:

1. A converter arrangement for light sources, comprising:
an axially pivotable carrying wheel having a total area;
a converter fixed on one side of the carrying wheel, the converter comprising fluorescent material sufficient to convert impinging light into light having a different wave length by fluorescence and sufficient to emit the light having the different wave length, the converter being delimited by an outer boundary curve that defines an area of the converter; and
a ratio of the total area to the area of the converter that is at least 4.5:1, wherein the carrying wheel has a diameter that is at least greater by a factor 1.5 than the outer boundary curve of the converter.

2. The converter arrangement as claimed in claim 1, wherein the ratio is less than 50:1.

3. The converter arrangement as claimed in claim 1, wherein the carrying wheel comprises a material having a thermal conductivity coefficient of at least 50 W/mK.

4. The converter arrangement as claimed in claim 1, further comprising a heat dissipation that is greater than 150 $WK^{-1}m^{-2}*F$, wherein F is the area in square meters.

5. The converter arrangement as claimed in claim 4, wherein the heat dissipation is greater than 240 $WK^{-1}m^{2}*F$.

6. The converter arrangement as claimed in claim 1, further comprising a remaining area of the carrying wheel that is not covered by the converter.

7. The converter arrangement as claimed in claim 6, wherein the remaining area is blackened.

8. The converter arrangement as claimed in claim 7, wherein the remaining area has an emissivity ε of greater than 0.1.

9. The converter arrangement as claimed in claim 1, wherein the converter comprises an opto-ceramic or silicone provided with the fluorescent material.

10. The converter arrangement as claimed in claim 1, wherein the converter comprises opto-ceramic segments on the carrying wheel, wherein the segments are secured on the carrying wheel by a method selected from the group consisting of deposition, gluing, and soldering.

11. The converter arrangement as claimed in claim 1, further comprising a second axially pivotable wheel axially spaced from the carrying wheel.

12. The converter arrangement as claimed in claim 1, wherein the carrying wheel is a fan wheel, the converter arrangement further comprising a motor that rotates the fan wheel such that air is axially sucked in during rotation.

13. The converter arrangement as claimed in claim 12, wherein the fan wheel is configured so that the air is sucked in axially from a side facing away from the converter.

14. The converter arrangement as claimed in claim 1, wherein the carrying wheel further comprises a light reflecting surface, the converter covering the light reflecting surface.

15. A light source comprising:
a converter arrangement having an axially pivotable carrying wheel having a total area, a converter fixed on one side of the carrying wheel, the converter comprising fluorescent material sufficient to convert impinging light into light having a different wave length by fluorescence and sufficient to emit the light having the different wave length, the converter being delimited by an outer boundary curve that defines an area of the converter, and a ratio of the total area to the area of the converter that is at least 4.5:1, wherein the outer boundary curve is spaced apart from a lateral edge of the carrying wheel, wherein the carrying wheel has a diameter that is at least greater by a factor 1.5 than the outer boundary curve of the converter;
a light emitting element that emits the impinging light as a light spot on the converter; and
a motor that rotates the converter arrangement during illumination by the light emitting element so that the light spot is distributed on a circular track on the converter after one turn of the converter arrangement.

16. The light source as claimed in claim 15, wherein the ratio is at least 5:1.

17. The light source as claimed in claim 15, wherein the light emitting element comprises a laser.

18. The light source as claimed in claim 15, wherein the circular track has a diameter that is at least 0.8-times a diameter of the outer boundary curve of the converter.

19. A converter arrangement for light sources, comprising:
an axially pivotable carrying wheel having a total area, wherein the carrying wheel is a fan wheel;
a converter fixed on one side of the carrying wheel, the converter comprising fluorescent material sufficient to convert impinging light into light having a different wave length by fluorescence and sufficient to emit the light having the different wave length, the converter being delimited by an outer boundary curve that defines an area of the converter, wherein the outer boundary curve has a smaller diameter than a perimeter of the carrying wheel, and wherein the carrying wheel has a diameter that is at least greater by a factor 1.5 than the outer boundary curve of the converter; and
a motor that rotates the fan wheel, wherein the fan wheel is configured so that air is sucked in axially through an opening in the side of the carrier wheel on which the converter is fixed and is blown off, radially along a side of the carrying wheel that faces away from the converter.

20. The converter arrangement as claimed in claim 19, further comprising a ratio of the total area to the area of the converter that is at least 3:1.

21. A converter arrangement for light sources, comprising:
an axially pivotable carrying wheel having a total area;
a converter, the converter comprising a ceramic fixed on one side of the carrying wheel, the converter comprising fluorescent material sufficient to convert impinging light into light having a different wave length by fluorescence and sufficient to emit the light having the different wave length, the converter being delimited by an outer boundary curve that defines an area of the converter, the area of the converter being the area enclosed by the boundary curve; and a ratio of the total area to the area of the converter that is at least 4.5:1, wherein the carrying wheel has a diameter that is at least greater by a factor 1.5 than the outer boundary curve of the converter.

22. The converter arrangement as claimed in claim 21, further comprising a remaining area of the carrying wheel that is not covered by the converter, the remaining area having an emissivity of greater than 0.7.

23. The converter arrangement as claimed in claim 21, further comprising a heat dissipation that is greater than 240 $WK^{-1}m^{-2}*F$, wherein F is the area in square meters.

24. The converter arrangement as claimed in claim 21, wherein the carrying wheel further comprises a light reflecting surface, the converter covering the light reflecting surface.

* * * * *